(12) United States Patent
Hansson (10) Patent No.: US 9,138,813 B2
(45) Date of Patent: Sep. 22, 2015

(54) HOLE-MAKING TOOL

(71) Applicant: SANDVIK INTELLECTUAL PROPERTY AB, Sandviken (SE)

(72) Inventor: Per Hansson, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 172 days.

(21) Appl. No.: 13/744,464

(22) Filed: Jan. 18, 2013

(65) Prior Publication Data
US 2014/0030038 A1 Jan. 30, 2014

(30) Foreign Application Priority Data

Jan. 20, 2012 (SE) ........................................ 1250035

(51) Int. Cl.
*B23B 51/00* (2006.01)
*B23B 51/04* (2006.01)
*B23C 5/22* (2006.01)
*B23B 27/16* (2006.01)
*B23D 77/02* (2006.01)

(52) U.S. Cl.
CPC ............ *B23B 51/048* (2013.01); *B23B 27/1622* (2013.01); *B23C 5/2221* (2013.01); *B23C 5/2226* (2013.01); *B23D 77/025* (2013.01); *B23B 51/00* (2013.01); *B23B 2200/161* (2013.01); *B23B 2200/165* (2013.01); *B23B 2205/12* (2013.01); *B23B 2251/50* (2013.01); *B23C 2200/165* (2013.01); *B23C 2210/168* (2013.01); *B23D 2277/84* (2013.01); *Y10T 408/89* (2015.01); *Y10T 408/9098* (2015.01)

(58) Field of Classification Search
USPC .......................... 408/231, 233, 713, 187, 188
See application file for complete search history.

(56) References Cited

U.S. PATENT DOCUMENTS

| | | | | |
|---|---|---|---|---|
| 6,840,716 B2 * | 1/2005 | Morgulis et al. | ................ | 407/34 |
| 6,884,008 B2 * | 4/2005 | Minshall | ....................... | 407/113 |
| 7,390,149 B2 * | 6/2008 | Wihlborg | ........................ | 407/35 |
| 7,670,088 B2 * | 3/2010 | Andersson et al. | ............. | 407/33 |
| 7,832,964 B2 * | 11/2010 | Andersson et al. | ........... | 407/113 |
| 8,684,640 B2 | 4/2014 | Hansson | | |
| 8,845,243 B2 | 9/2014 | Hansson | | |

FOREIGN PATENT DOCUMENTS

| | | |
|---|---|---|
| EP | 0037691 A2 | 10/1981 |
| EP | 1702703 A1 | 9/2006 |
| EP | 1952925 A2 | 8/2008 |
| JP | H06126511 A | 5/1994 |
| WO | 2008073037 A1 | 6/2008 |

\* cited by examiner

*Primary Examiner* — Daniel Howell
*Assistant Examiner* — Yasir Diab
(74) *Attorney, Agent, or Firm* — Corinne R. Gorski (57) ABSTRACT

A hole-making tool includes a body having a seat, which is delimited by a tangential support surface, an axial support surface, and a radial support surface. A cutting insert is fixed in the seat. A pair of female- and male-like securing means is arranged in the interface between the tangential support surface of the seat and the underside of the cutting insert. The female-like securing means includes a guide surface. The male-like securing means is spaced from the guide surface to form a gap between the securing means when the cutting insert is pressed against the axial and radial support surfaces. If the feeding direction of the tool is reversed, the cutting insert may become detached from the seat and the securing means is activated to direct the cutting insert inward toward the radial support surface to prevent the peripheral portion of the cutting insert from scratching the generated hole.

9 Claims, 6 Drawing Sheets

HOLE-MAKING TOOL

RELATED APPLICATION DATA

This application claims priority under 35 U.S.C. §119 to Swedish Patent Application No. 1250035-1, filed on Jan. 20, 2012, which the entirety thereof is incorporated herein by reference.

TECHNICAL FIELD OF THE INVENTION

This invention relates to a hole-making tool of the type that includes a basic body having a seat delimited by a tangential support surface, an axial support surface, and a radial support surface. The support surface is situated closest to a center axis of the tool. The hole-making tool also includes a replaceable cutting insert, which has an upper side and an under side, and a plurality of side contact surfaces. The cutting insert is fixed in the seat by a tightening member, which holds the underside of the cutting insert pressed against the tangential support surface of the seat and holds two side contact surfaces against the axial and radial support surfaces thereof.

BACKGROUND OF THE INVENTION

Hole making or drilling generally embraces all methods for, by means of a cutting or chip-removing tool, recessing cylindrical holes in a workpiece. In addition to solid drilling, such as short-hole drilling and long-hole drilling, the present technique also includes such subsequent machining as reaming, countersinking, and different forms of finishing. Common to the different hole-making tools, to which the invention is applicable, is that a rotary motion is combined with a linear or rectilinear feeding motion. For instance, a drill can simultaneously be rotated and fed linearly during the machining of a stationary workpiece. The requisite relative motion between the tool and the workpiece may also be provided in another way, e.g., by the tool being longitudinally fed at the same time as the workpiece rotates, or vice versa. In certain operations, e.g., reaming, the tool is brought through a pre-drilled hole without being intended to be brought back out of the same. In other operations, the tool is intended to be brought into as well as out of the hole. However, also in the first case, the need of retracting the tool through the machined hole may arise, for instance if one or more cutting inserts become damaged or come loose from the tool, or that the driving machine facility stops. Irrespective of whether a retraction of the tool from the hole is intentional or unintentional, problems may arise so far that the surrounding hole surface risks being damaged by peripherally situated cutting inserts. At times, difficulties when removing the tool from the hole also occur. Damage to the hole surface is generally undesired. In the worst case, the same may cause rejections of expensive components.

In U.S. Pat. Nos. 8,845,243 and 8,684,640, there are disclosed two hole-making tools in the form of reaming tools, the basic body and cutting inserts of which are formed with a pair of co-operatable male- and female-like securing means, which do not contact each other as long as the cutting insert, due to the axially acting cutting forces, is held in close contact pressed against the axial support surface in an appurtenant seat in the basic body of the tool, but which are activated as soon as the cutting insert, due to a reversal of the axial direction of motion of the tool, is moved apart from the axial support surface. More precisely, the securing means are formed in such a way that a gap or play of 0.1-0.2 mm is maintained between the same as long as the cutting insert is reliably fixed in the seat. If the tool, after a mishap has occurred, needs to be removed from the machined hole, the securing means are activated during the extremely short time that the cutting insert moves axially 0.1-0.2 mm, wherein the securing means relieve the tightening member, e.g., a screw, that clamps the cutting insert in the seat. However, the securing means of the disclosed tool are only intended to counteract axial displacement of the cutting insert out of the seat, but not to prevent the cutting insert from moving in the direction radially out of the seat. Even if the securing means generally guarantee that the cutting insert remains in the seat, the same do not prevent or counteract the cutting insert from moving radially outward; which may give cause scratches or other damage in the generated hole surface.

OBJECTS AND FEATURES OF THE INVENTION

The present invention provides a hole-making tool, which allows reversal or retraction of the tool from a hole without damaging the hole surface or making the retraction more difficult. Therefore, a primary object of the invention is to provide a hole-making tool having one or more peripherally mounted cutting inserts, which in a reliable way resist such forces that aim to remove the cutting insert axially out of the seat during reversal of the direction of motion of the tool, and such forces that aim to separate the cutting insert from the radial support surface of the seat. It is also an object to provide a hole-making tool that is simple and inexpensive to manufacture. In a particular aspect, the invention aims at providing a hole-making tool that has a long service life even if not only a cutting insert, but also an appurtenant seat would be damaged. In other words, the tool should not need to be discarded in its entirety if a seat of a cutting insert is demolished.

According to the invention, at least the primary object is achieved due to the interface between the tangential support surface of the seat and the underside of the cutting insert being formed with a pair of female- and male-like securing means. The female-like securing means having an elongate guide surface, which extends at an acute angle in relation to the radial support surface, while the same approaches this in the direction from the axial support surface. The male-like securing means is spaced apart from the guide surface while forming a play between the two securing means as long as the cutting insert, by the cutting forces, is kept pressed against the axial and radial support surfaces.

By the above-mentioned construction, it is guaranteed that the cutting insert, in connection with a possible reversal of the feeding direction of the tool, does not tend to be spaced apart from the radial support surface and scratch or in another way damage the generated hole surface.

In the present application, the expressions "male-like" and "female-like securing means" relate to securing means of the type male-female, or in other words, a projecting detail that co-operates with a recess, hole, or the like, adapted for the same. A pair of male-female-like securing means may comprise an individual male member that co-operates with an individual female member, but it is also possible that each male-like securing means comprises several male details that co-operate with one or more female details.

In one embodiment, the female-like securing means is formed in the underside of the cutting insert, while the male-like securing means is included in the tangential support surface of the seat. An advantage of this embodiment is that the manufacture of the cutting insert, as well as of the seat for the same is facilitated. For pressing technical reasons, the cutting insert becomes stronger if the same is formed with female-like countersinks than with male-like projections.

In one embodiment, the male-like securing means may be an elongate ridge. In such a way, a robust stop surface is provided for the cutting insert upon a wo possible reversal of the feeding direction of the tool.

In one embodiment, the securing means may be a stud that projects from the tangential support surface and is in line contact with the guide surface rather than the surface contact. In such a way, the risk of inadequate tolerances disturbing the function of the securing means is eliminated.

Furthermore, it is feasible to form the male-like securing means, irrespective if it is a ridge or a stud, in the form of an inset, which can be mounted in a countersink mouthing in the tangential support surface. In such a way, the manufacture of the seat in the basic body is facilitated, at the same time as the solution affords the possibility of using different materials, in particular different steel no grades, in the male-like securing means and the basic body, respectively. For instance, the male-like securing means may be manufactured from a steel that is harder than the steel of the basic body.

In a preferred embodiment of the invention, the co-operatable securing means are formed with an amount of play, which, when the cutting insert is pressed against the axial and radial support surfaces of the seat, amounts to at most 0.25 mm. Advantageously, the play is in the interval of 0.03-0.2 mm. In such a way, it is guaranteed that the latent securing function of the securing means is activated very quickly after the tightening device for the cutting insert has been subjected to bending loads, as a consequence of a reversal of the feeding direction of the tool.

According to another embodiment, the angle between the guide surface of the female-like securing means and the radial support surface of the seat is selected to a value of at least 20° and at most 70°. In such a way, it is guaranteed, on one hand, that the cutting insert, after a possible activation of the securing means, is pressed against the radial support surface by considerable force, and on the other hand that the activation of the securing means occurs at optimum speed.

In one embodiment of the invention, the interface between the underside of the cutting insert and the tangential support surface of the seat is formed with not only a first pair of co-operable female- and male-like securing means, but also with a second pair located between the radial support surface and the first pair. In such a way, it is guaranteed not only that the cutting insert is reliably pressed against the radial support surface, but also that axial displacement of the cutting insert in the direction from the axial support surface is efficiently prevented.

The basic body, in which the seat is formed, may be a separate cassette that is detachably mounted on a tool head. If the seat—together with the cutting insert—would be damaged, the tool head does not need to be replaced in its entirety, but only the cassette.

DETAILED DESCRIPTION

Figure 1:
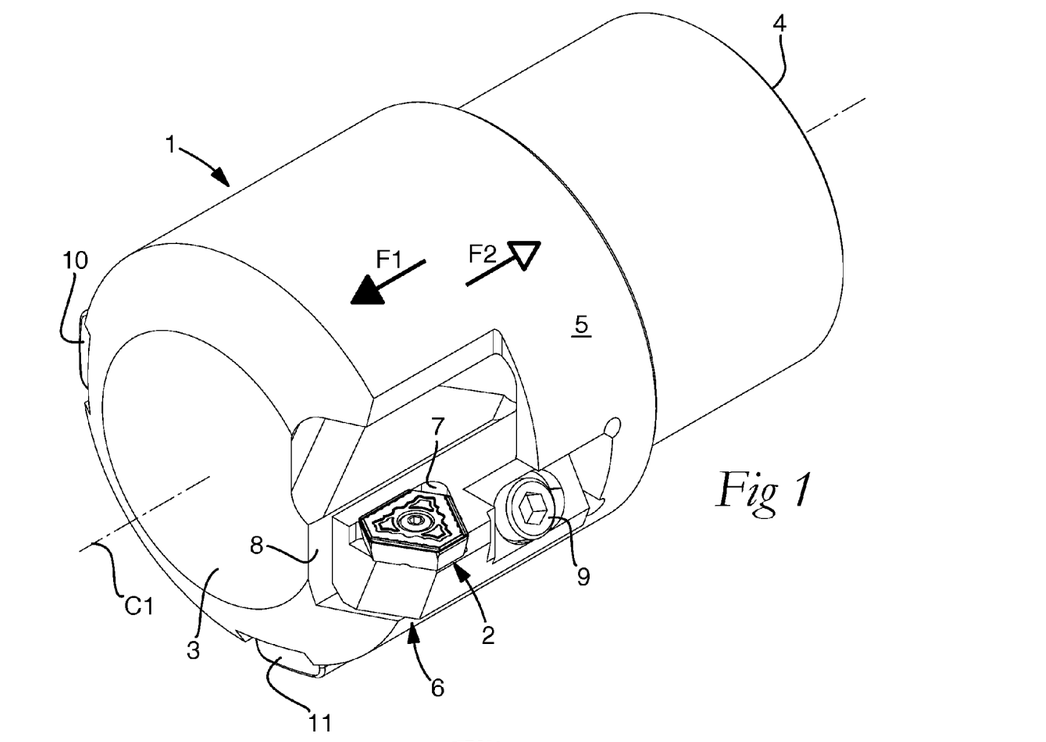
FIG. 1 is a perspective view of a hole-making tool in the form of a reamer having only one peripheral cutting insert.
Figure 2:
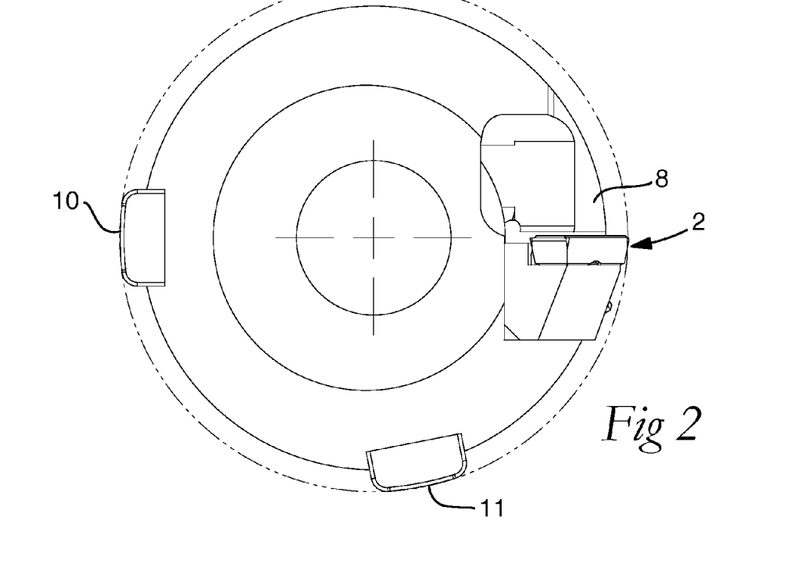
FIG. 2 is an end view from the front of the tool according to FIG. 1.
Figure 3:
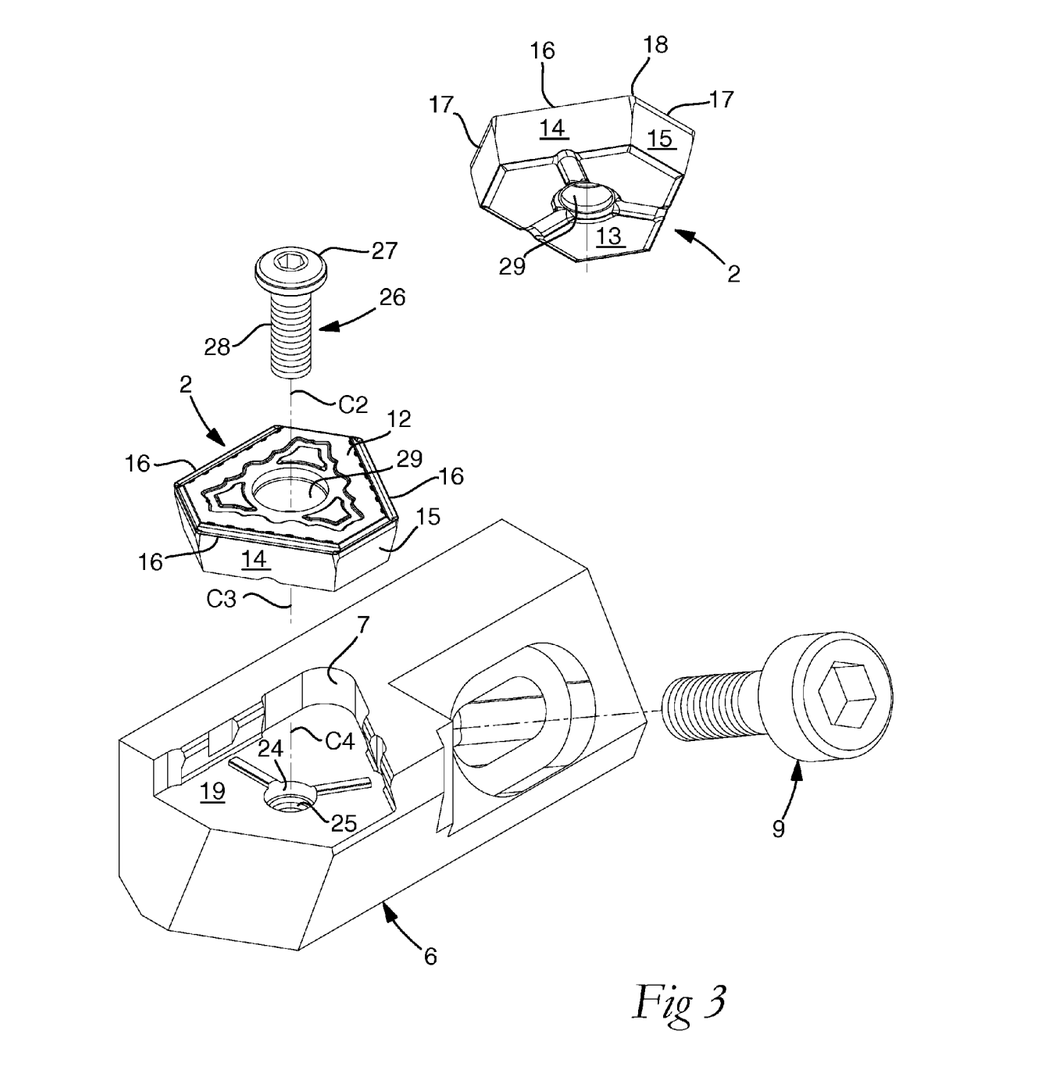
FIG. 3 is a perspective exploded view of a basic body included in the tool and in the form of a cassette having a seat for the cutting insert of the tool, a detached cutting insert being shown not only in a top view but also in a bottom view.
Figure 4:
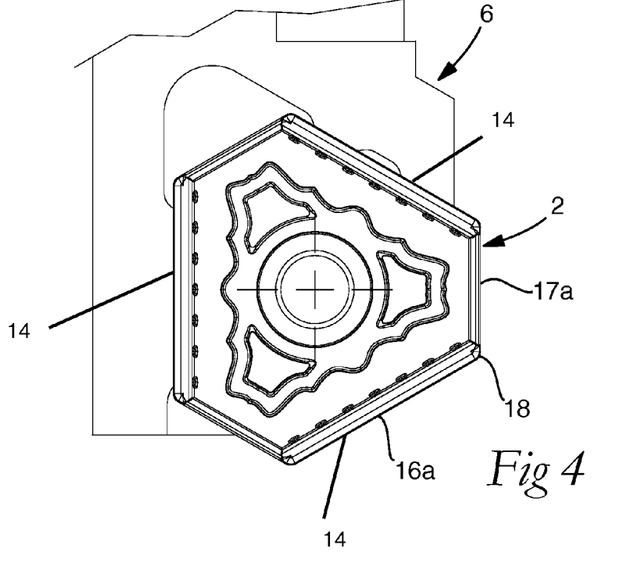
FIG. 4 is a partial planar view from above showing the cutting insert mounted in the appurtenant seat.

In FIGS. 1 and 2, a hole-making tool is shown in the form of a reamer, which includes a head 1 and a replaceable cutting insert 2. The head 1 includes front and rear ends 3, 4 between which a center axis C1 of the tool extends, with which a rotationally symmetrical envelope surface 5 is concentric and on which the head can, if required, be rotated. To the head 1, a cassette 6 is detachably connected, in which a seat 7 for the cutting insert 2 is formed. The cassette 6 is mounted in a pocket 8 that is countersunk in the envelope surface 5 and opens in the front end of the head. The cassette 6 is held fixed in the pocket by means of a bolt 9. As shown in FIGS. 1 and 2, a pair of support and guide pads 10, 11 are tangentially spaced-apart from the solitary cutting insert 2, in order to, together with the same, provide a three-point support for the tool during the reaming of a (pre-drilled) hole, which is indicated by means of a dash-dotted circular line in FIG. 2. In FIGS. 1, F1 and F2 designate the forward and rearward feeding direction of the tool, respectively.

In the exemplified embodiment, the cassette 6 forms a basic body, in which the seat 7 for the cutting insert 2 is formed. However, it is also feasible to spare the cassette and form the seat directly in the head 1, wherein the same would form a basic body for the seat.

Reference is now made to FIGS. 3-6, in which it is shown that the cutting insert 2 in the example has a hexagonal basic shape and includes an upper side 12, an underside 13, and six side surfaces 14, 15, three ones of which, viz. the surfaces 14, form contact surfaces. The cutting insert is indexable and single sided by no including cutting edges only along the periphery of the upper side. More precisely, the cutting insert 2 includes three alternately usable cutting edges 16, which are formed in the transitions between the upper side and the side surfaces 14. In operation, the side surfaces 14 form clearance surfaces. The edge portions, designated 17, that run between the respective cutting edges 16 are inactive during chip removal. More precisely, the edge portion, which is designated 17a in FIG. 4, clears from the cylindrical hole surface generated by the cutting edge 16a that is active on the occasion. In the corner 18 between the active cutting edge 16a and the inactive edge portion, a diminutive secondary edge or wiper edge (lacks designation) may advantageously be formed, having the purpose of wiping off the generated surface with the aim of providing an optimum smoothness. For the sake of completeness, it should be pointed out that the cutting insert has a positive cutting geometry by the fact that the angle between the upper side and the individual side clearance surface 14 is acute (most often within the range of 80-83°).

The seat 7 of the cutting insert (see FIG. 6) is delimited by three support surfaces, viz. a tangential support surface 19, an axial support surface 20, and a radial support surface 21. As is seen by these denominations, the surface 19 receives the tangential cutting forces that act on the cutting insert during machining, the surface 20 receives the axial cutting forces, and the surface 21 receives the radial forces. The tangential support surface 19 is plane and forms a bottom in the seat, while the surfaces 20, 21 are included in the sides of the seat. In the example, each axial and radial support surface includes two part surfaces, which are separated by a countersink 22, 23. In the tangential support surface 19, a hole 24 mouths having a female thread 25.

For the fixation of the cutting insert in the seat, a tightening device is used, for example, a screw 26 (see FIG. 3) having a head 27 and a male thread 28. This screw can be brought through a central hole 29 (FIG. 3) in the cutting insert and tightened in the hole 24. By spring-biasing the screw, the same cannot only press the underside of the cutting insert against the tangential support surface 19, but also presses the two side clearance surfaces 14 against the axial and radial support surfaces 20, 21.

When the tool is longitudinally fed forward in the direction of the arrow F1 (see FIG. 1), the cutting insert 2 is subjected to cutting forces, which clamp the same against all support surfaces 19, 20, 21 in the seat 7. In this state, the holding effect of the screw 26 is negligible. De facto, the task of the screw is reduced to retain the cutting insert in the seat.

However, if the tool needs to be retracted from the hole in the direction of the arrow F2 (FIG. 1), the cutting insert may, if the insert gets caught against the hole wall (e.g., by friction or seizure), be subjected to forces that aim to, on one hand, remove the insert axially out of the seat, but also radially out of the seat against the action of the screw 26. In this state, only the screw secures the cutting insert in the seat, but because the screw has a moderate bending stiffness, in particular if the cutting insert and the screw have small dimensions, the cutting insert may be moved from the seat. If just a radial motion occurs the cutting edge may scratch or in another way damage the generated surface.

According to the invention, in order to remedy the above-mentioned problems, in the interface between the underside of the cutting insert and the tangential support surface of the seat, a pair of co-operable securing means is arranged, one of which is generally female-like, and the other male-like. These securing means are described in more detail below.

Figure 6:
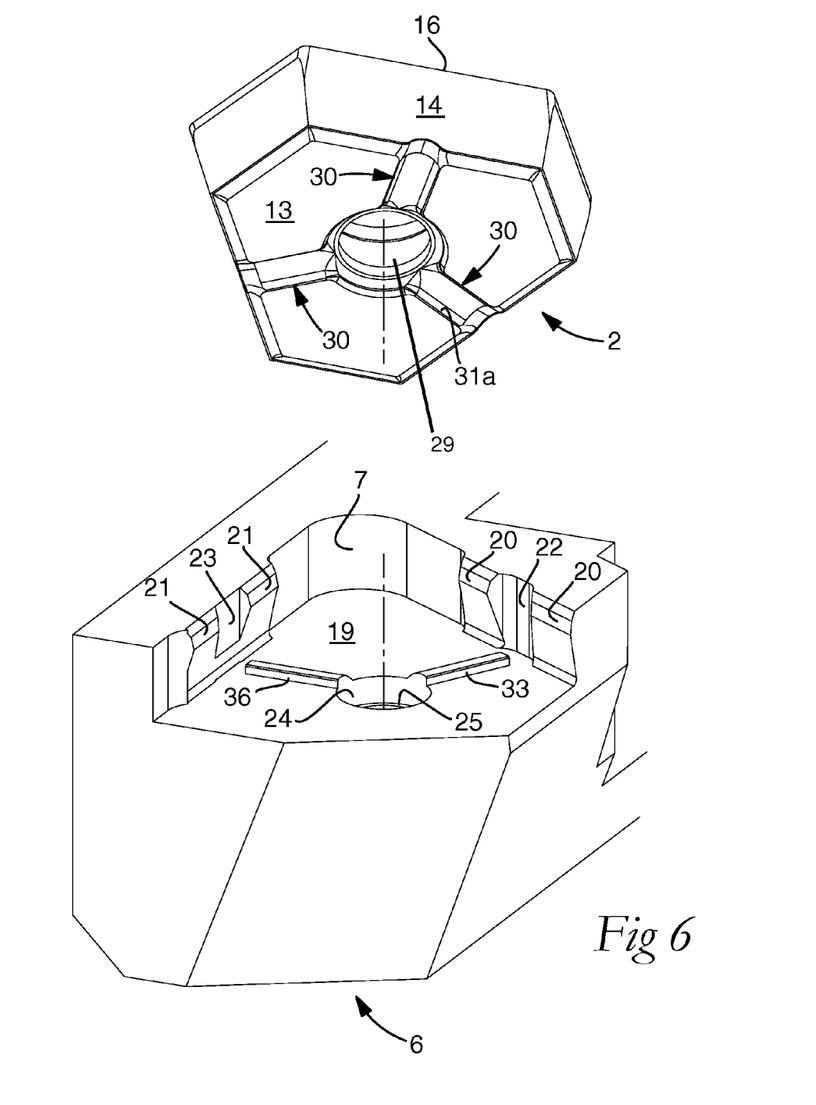
FIG. 6 is an enlarged exploded view showing the seat in bottom view and the cutting insert in top view.

As may be best seen in FIG. 6, in the underside 13 of the cutting insert, there are formed three grooves 30, which extend from the common hole 29 (FIG. 3) to the periphery of the cutting insert, where each individual groove opens in a side clearance surface 14. Thus, the number of grooves corresponds to the number of usable cutting edges. It should also be noted that each individual groove 30 extends perpendicular to the appurtenant side clearance surface 14.

Figure 7:
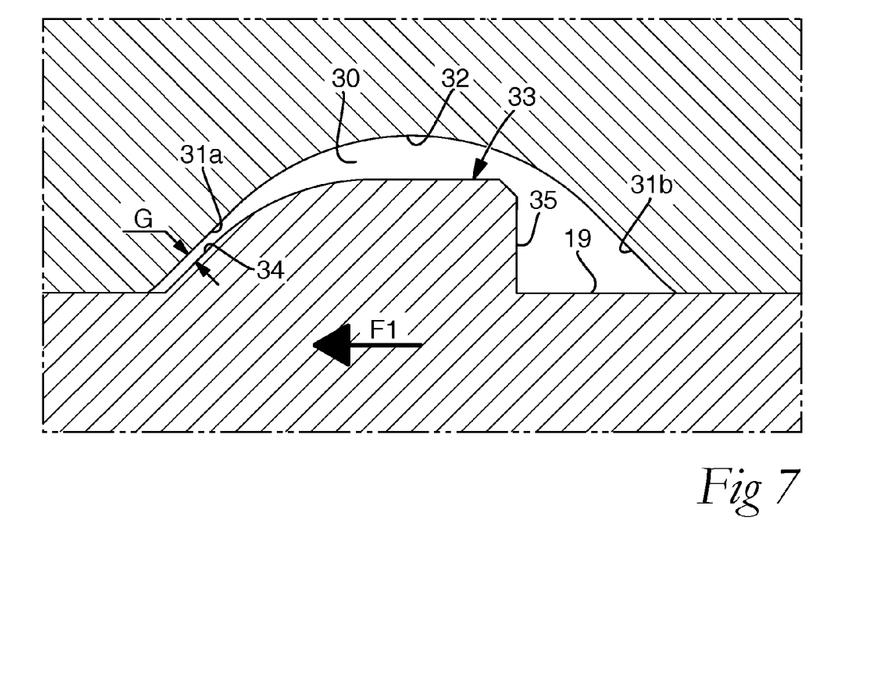
FIG. 7 is an enlarged cross-section through the interface between the cutting insert and the seat located in the plane XII-XII in FIG. 5, two securing means being shown separated from each other in an initial position.
Figure 8:
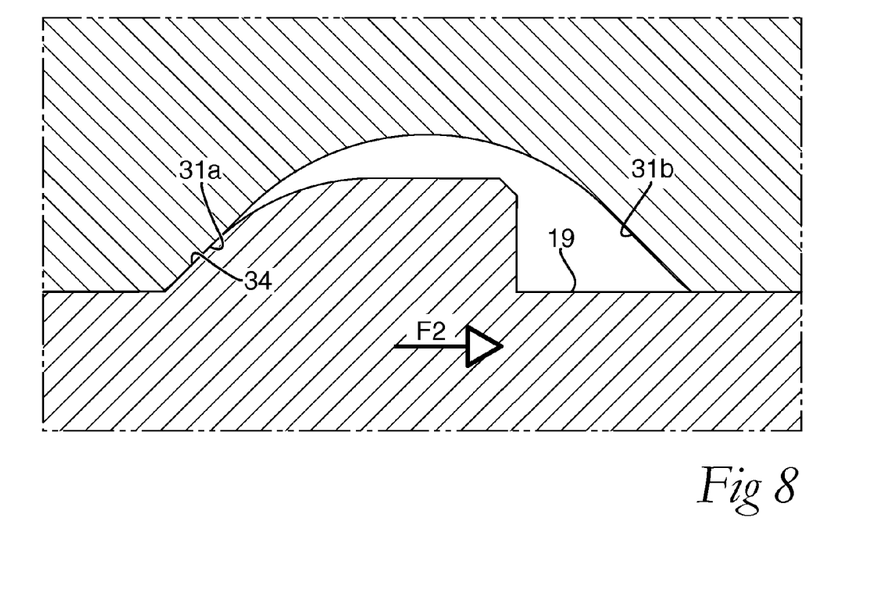
FIG. 8 is a cross-section corresponding to FIG. 7 showing the securing means in contact with each other.

The cross-sectional shape of the individual groove is best seen in FIGS. 7 and 8. Thus, the groove is delimited by two essentially plane flank surfaces 31a, 31b, which are oriented at an obtuse angle to each other and transform into each other via an arched surface 32. Depending on the index position of the cutting insert, each one of the grooves 30 can co-operate with a ridge 33, which is formed in the seat, projects from the tangential support surface 19, and extends perpendicular to the axial support surface 20. Ridge 33 forms a male-like securing means intended to co-operate with a female-like securing means in the form of one of the grooves 30. The ridge 33 includes two parallel side surfaces 34, 35, surface 35 forming an angle of 90° with the tangential support surface 19, while surface 34 leans toward the tangential support surface at approximately the same angle as the flank surfaces 31a, 31b of the groove lean toward the underside 13 of the cutting insert. It should be noted that the width of the ridge is considerably smaller than the width of the groove.

Figure 5:
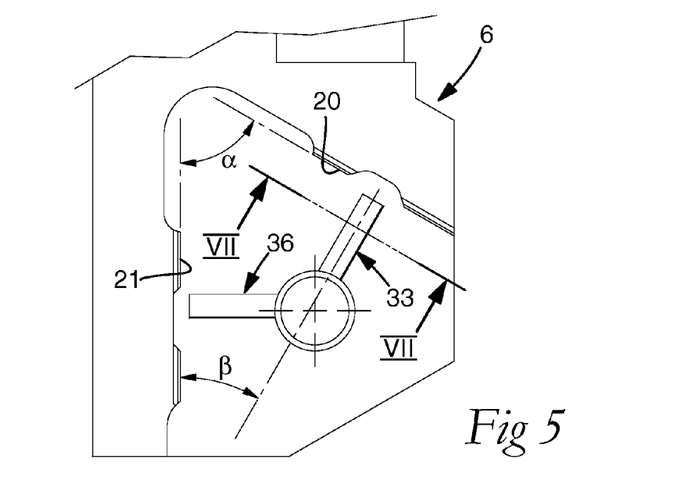
FIG. 5 is a plane elevation view of only the seat.

Referring to FIG. 5, an angle α between the axial and radial support surfaces 20, 21 is, for example, 60° because the angle between the usable cutting edges 16 of the cutting insert is precisely 60°. As a consequence of the ridge 33 extending perpendicular to the axial support surface 20, the same will form an angle β of 30° with the radial support surface 21. It should be pointed out that the radial support surface 21 does not run exactly parallel to the center axis C1 of the tool. Thus, the radial support surface 21 forms a small angle in the backward/inward direction so as to provide a clearance between the peripheral edge 17 of the insert and the generated hole surface.

As shown in FIGS. 5 and 6, seat 7, in addition to the first-mentioned ridge 33, includes a second ridge 36, which extends perpendicular to the radial support surface 21 and which, like ridge 33, can co-operate with one of the three grooves 30 of the cutting insert.

As long as the cutting insert is held fixed against all support surfaces of the seat in connection with the tool being fed in the direction of the arrow F1 (FIG. 1), neither the ridge 33 nor the ridge 36 is in contact with the flank surfaces 31a, 31b in the appurtenant grooves 30. More precisely, the side surface 34 of the ridge 33 is separated from one flank surface 31a of the groove via a diminutive gap G. The size of this gap may vary, but should be within the range of 0.03-0.2 mm and amount to at most 0.25 mm. In other words, the individual ridge and the appurtenant groove are not in engagement with each other when the tool is fed forward.

If the cutting insert, in connection with a retraction of the tool in the direction of the arrow F2 (FIG. 1), gets caught against the hole wall, the same is subjected to forces that aim to separate the cutting insert from the axial support surface 20, as well as the radial support surface 21. These forces are initially received by the screw 26. However, if the screw tends to bend and yield to said forces, at least the first pair of co-operating securing means is activated, i.e., the ridge 33 and a groove 30. Thus, the flank surface 31a of the groove will be brought in contact with the side surface 34 of the ridge, as shown in FIG. 8. In doing so, the flank surface 31a will serve as a guide surface that can be displaced along the ridge. Because the groove 30 forms an angle β of 30° with the side clearance surface 14 that is to be pressed against the radial support surface 21, the displacement will cease when the surfaces 14 and 21 contact each other. In other words, the interaction between the surfaces 31a, 34 as shown in FIG. 8, will press the cutting insert toward the radial support surface 21. This, in turn will cause the tendency of the cutting insert to separate from the axial support surface 20 to be stopped.

As an extra precautionary measure, in addition to the inclined ridge 33, a second ridge 36 (FIGS. 5 and 6) is provided, the stopping side surface 34 of which faces rearward in order to co-operate with the flank surface 31b of the groove. However, the gap between the stop surface of the second ridge 36 and the side surface of the groove is somewhat greater than the gap G between the ridge 33 and the groove co-operating with the same. In such a way, it is guaranteed that the stopping function of the ridge 36 is activated somewhat after the stopping function of the ridge 33 has occurred. In other words, the ridge 33 first presses in the cutting insert against the radial support surface, whereupon the ridge 36 provides an extra security against the axial movement of the cutting insert. By means of at least the first described securing means, the tightening screw 26 is relieved from the occurring bending loads, whereby the cutting insert is retained in its fixed position in the seat as long as the screw is capable of pressing the same against the tangential support surface 19. By the fact that the cutting insert is kept pressed against the radial support surface 21, the risk of the peripheral corners 18 of the cutting insert scratching or in another way damaging the generated hole wall is eliminated or counteracted.

Figure 9:
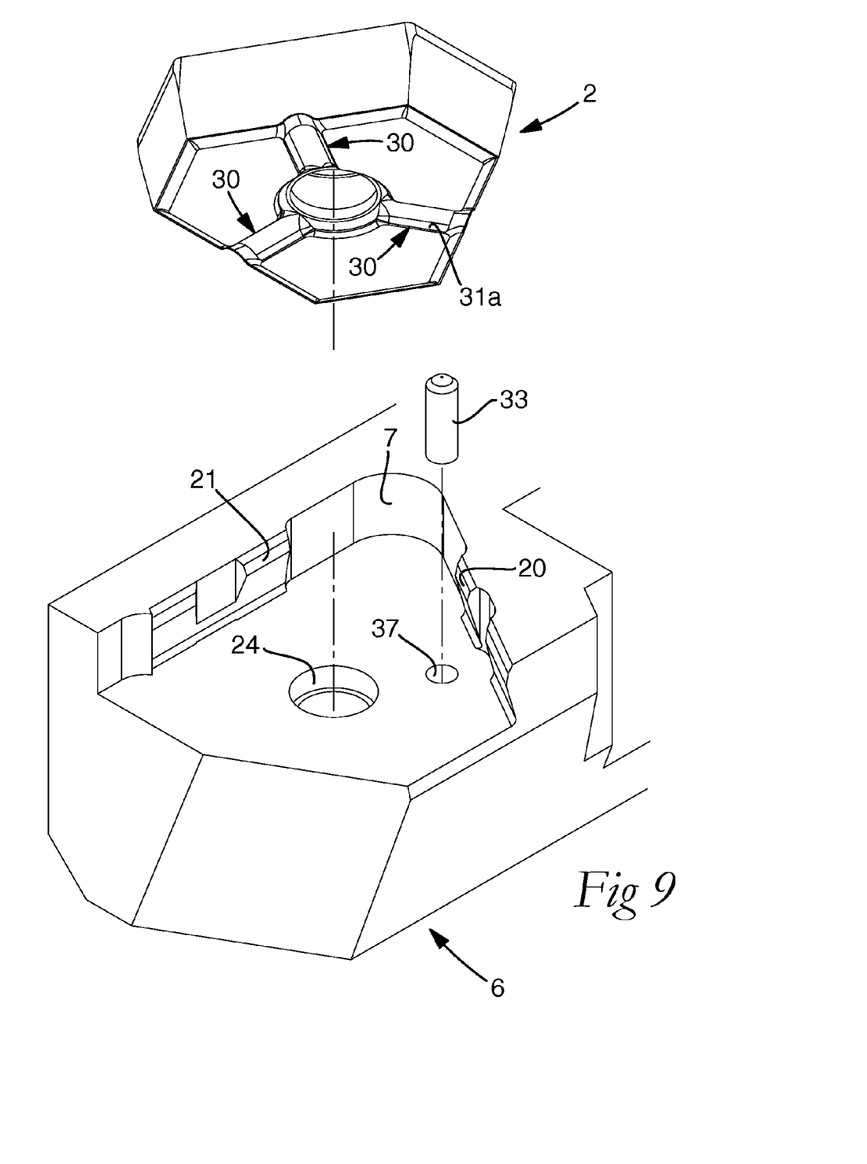
FIG. 9 is an exploded view corresponding to FIG. 6 showing an alternative embodiment of the invention.

Reference is now made to FIG. 9, which illustrates an alternative embodiment of the invention, wherein the male-like securing means is a stud 33 instead of a ridge. This stud is fixed in the seat by being clamped in a hole 37 placed beside the hole 24, more precisely in an area between the hole 24 and the axial support surface 20. As with the embodiment previously described, the cutting insert 2 includes three grooves 30, one of which co-operates with the stud 33 via an elongate guide surface 31a.

An advantage of the embodiment according to FIG. 9 is that the formation of the seat 7 is facilitated and is rendered more effective. Instead of milling the tangential support surface 19 while leaving the two projecting ridges 33, 36, as in the previous embodiment, the surface may be provided by simple face milling, whereupon the hole 37 is provided by means of a quick drill operation. In addition, the stud 33 is made as a separate inset and can be manufactured from another material than the material of the basic body 6. For instance, the basic body 6 and the stud 33 may be manufactured from two different steel grades, the one of which used in the stud is harder than the one of the basic body. In this context, it should for sake of completeness be pointed out that the cutting insert 2 is manufactured from a material that is considerably harder and more hard-wearing than the material of the basic body. In particular, cemented carbide is preferred in the cutting insert and steel in the basic body.

In the exemplified embodiments, the guide surface extends in the groove that co-operates with the male member with the purpose of retaining the cutting insert against the radial support surface, at an angle of 30° to the radial support surface. This angle, which in FIG. 5 is designated β, may, however, vary upward as well as downward. In practice, β should amount to at least 20° and at most 70°. If the cutting insert is three-edged or four-edged, β may suitably amount to 30° and 45°, respectively.

The invention is not limited only to the embodiments described above and shown in the drawings. Thus, the invention may be applied to other hole-making tools other than just reamers, provided that the tools include replaceable cutting inserts that are peripherally mounted on the tool. For instance, the invention could be applied to the peripheral cutting inserts of indexable insert drills. Neither do the cutting inserts need to have a polygonal basic shape, in that also round cutting inserts and the appurtenant seats may be formed with one or more pairs of co-operating, female- and male-like, respectively, securing means of the described kind. Although the exemplified tool, in which the male-like securing means is/are included in the seat and the female-like one in the cutting insert, also the opposite relationship is possible, i.e., with the male-like securing means formed on the underside of the cutting insert and the female-like securing means, which includes an inclined guide surface, formed in the tangential support surface of the seat. It should be mentioned that other, male-like securing means other than a stud may be formed as a separate inset that can be anchored in a countersink in the tangential support surface of the seat. In other words, the ridges shown do not need to be made integrally with the basic body. For the sake of completeness, it should also be mentioned that the seat or seats of the tool could be formed directly in the tool head, the latter serving as a basic body of the tool. Furthermore, the invention may be applied to such tools that include other tightening devices than exactly a screw for holding the cutting insert. For instance, the cutting insert may be clamped using a clamp or the like.

In conclusion, it should be pointed out that, in the subsequent claims, the tool is defined in its assembled state, i.e., with the cutting insert fixed in the seat.

The invention claimed is:

1. A hole-making tool comprising:
a basic body having a seat, the seat being delimited by a tangential support surface, an axial support surface, and a radial support surface that is situated closest to a center axis of the tool; and
a replaceable cutting insert removably disposed on the basic body, the cutting insert having an upper side, an underside and a plurality of side contact surfaces, the cutting insert being fixed in the seat by a tightening member that holds the underside of the cutting insert pressed against the tangential support surface of the seat, and two of the side contact surfaces against the axial and radial support surfaces of the seat, wherein an interface between the tangential support surface of the seat and the underside of the cutting insert includes at least one pair of male- and female-like securing means, the female-like-securing means including an elongate guide surface that extends at an acute angle in relation to the radial support surface of the basic body from the direction of the axial support surface, the male-like securing means being spaced apart from the guide surface and wherein a gap is formed between the pair of securing means as long as the cutting insert is kept pressed against the axial and radial support surfaces by cutting forces.

2. The hole-making tool according to claim 1, wherein the female-like securing means is formed in the underside of the cutting insert, while the male-like securing means is included in the tangential support surface of the seat.

3. The hole-making tool according to claim 2, wherein the male-like securing means is an elongated ridge that projects from the tangential support surface of the seat.

4. The hole-making tool according to claim 2, wherein the male-like securing means is a stud projecting from the tangential support surface.

5. The hole-making tool according to claim 3, wherein the male-like securing means is an inset that is mounted in a countersink opening located in the tangential support surface.

6. The hole-making tool according to claim 1, wherein the gap between the pair of securing means, when the cutting insert is pressed against the axial and radial support surfaces of the seat, is at most 0.25 mm.

7. The hole-making tool according to claim 1, wherein the angle between the guide surface of the female-like securing means and the radial support surface of the seat is at least 20° and at most 70°.

8. The hole-making tool according to claim 1, wherein the at least one pair of securing means includes a first pair of co-operable female- and male-like securing means and a second pair of male and female-like securing means, the interface between the underside of the cutting insert and the tangential support surface of the seat including the first pair of co-operable female- and male-like securing means and the second pair of male and female-like securing means is located between the radial support surface and the first pair of male and female securing means.

9. The hole-making tool according to claim 1, wherein the basic body is a cassette detachably mounted on a tool head.

* * * * *